(12) United States Patent
Lindop et al.

(10) Patent No.: US 8,146,027 B1
(45) Date of Patent: Mar. 27, 2012

(54) CREATING INTERFACES FOR IMPORTATION OF MODULES INTO A CIRCUIT DESIGN

(75) Inventors: Nathan A. Lindop, Musselburgh (GB); Brian Cotter, Tranent (GB); Scott Leishman, Edinburgh (GB); Martin Sinclair, Eskbank (GB)

(73) Assignee: Xilinx, Inc., San Jose, CA (US)

( * ) Notice: Subject to any disclaimer, the term of this patent is extended or adjusted under 35 U.S.C. 154(b) by 336 days.

(21) Appl. No.: 12/437,523

(22) Filed: May 7, 2009

(51) Int. Cl.
*G06F 17/50* (2006.01)

(52) U.S. Cl. ........ 716/102; 716/103; 716/104; 716/132; 703/15

(58) Field of Classification Search .................. 716/102, 716/103, 104, 132; 703/15
See application file for complete search history.

(56) References Cited

U.S. PATENT DOCUMENTS

| | | | | |
|---|---|---|---|---|
| 6,106,568 A * | 8/2000 | Beausang et al. | ............. | 716/102 |
| 6,167,561 A * | 12/2000 | Chen et al. | ............. | 716/102 |
| 6,237,007 B1 * | 5/2001 | Brown | ............. | 700/97 |
| 6,401,230 B1 * | 6/2002 | Ahanessians et al. | ......... | 716/102 |
| 6,539,520 B1 * | 3/2003 | Tiong et al. | ............. | 716/102 |
| 7,086,014 B1 * | 8/2006 | Bartz et al. | ............. | 716/102 |
| 7,299,439 B1 * | 11/2007 | Slonim et al. | ............. | 716/116 |
| 7,302,670 B2 * | 11/2007 | Bowyer et al. | ............. | 716/102 |
| 7,433,813 B1 * | 10/2008 | Ballagh et al. | ............. | 703/16 |
| 7,451,422 B1 * | 11/2008 | Slonim et al. | ............. | 716/138 |
| 7,480,884 B1 * | 1/2009 | Slonim et al. | ............. | 716/119 |
| 7,594,212 B1 * | 9/2009 | Gaitonde et al. | ............. | 716/124 |
| 7,844,761 B1 * | 11/2010 | Orthner et al. | ............. | 710/62 |
| 7,877,248 B1 * | 1/2011 | Clune | ............. | 703/13 |
| 7,979,844 B2 * | 7/2011 | Srinivasan | ............. | 717/119 |
| 7,992,119 B1 * | 8/2011 | Iotov et al. | ............. | 716/119 |
| 8,010,924 B1 * | 8/2011 | Slonim et al. | ............. | 716/116 |
| 8,024,167 B2 * | 9/2011 | Szpak et al. | ............. | 703/13 |
| 8,028,258 B1 * | 9/2011 | Ogami et al. | ............. | 716/110 |
| 8,069,286 B1 * | 11/2011 | Orthner et al. | ............. | 710/62 |
| 2004/0128626 A1 * | 7/2004 | Wingren et al. | ............. | 716/1 |
| 2005/0055612 A1 * | 3/2005 | Yamada | ............. | 714/724 |
| 2005/0066295 A1 * | 3/2005 | Cooke et al. | ............. | 716/1 |
| 2006/0218512 A1 * | 9/2006 | Arslan et al. | ............. | 716/4 |
| 2006/0230369 A1 * | 10/2006 | Cooke et al. | ............. | 716/4 |
| 2007/0044051 A1 * | 2/2007 | McGaughy et al. | ............. | 716/5 |
| 2008/0010625 A1 * | 1/2008 | Bittner et al. | ............. | 716/12 |
| 2008/0077906 A1 * | 3/2008 | Bowyer et al. | ............. | 716/18 |
| 2008/0147359 A1 * | 6/2008 | Brown et al. | ............. | 703/1 |
| 2009/0248385 A1 * | 10/2009 | Szpak et al. | ............. | 703/14 |

FOREIGN PATENT DOCUMENTS

GB 2327836 A * 2/1999
WO WO 9618147 A1 * 6/1996

* cited by examiner

*Primary Examiner* — Phallaka Kik
(74) *Attorney, Agent, or Firm* — Kevin T. Cuenot (57) ABSTRACT

A computer-implemented method of incorporating a module within a circuit design can include, responsive to identifying the module to be imported into the circuit design, automatically identifying each port of the module, displaying a list of the ports of the module, and receiving a user input selecting a plurality of ports of the module for inclusion in an interface through which the module communicates with the circuit design. Responsive to a user input specifying an interface type, the interface type can be associated with the plurality of ports. The interface type can be associated with a port list including standardized ports. Individual ones of the plurality of ports can be automatically matched with standardized ports from the port list. A programmatic interface description specifying the interface for the module can be output.

20 Claims, 6 Drawing Sheets

CREATING INTERFACES FOR IMPORTATION OF MODULES INTO A CIRCUIT DESIGN

FIELD OF THE INVENTION

The embodiments disclosed herein relate to integrated circuit devices (ICs). More particularly, the embodiments relate to processing ports when importing a circuit block or module into a circuit design.

BACKGROUND

Circuit designs are typically created in modular fashion. That is, each subsystem of the circuit design can be independently implemented as a module, for example, in a hardware description language (HDL) or within another tool such as a high level modeling system that operates at a higher level of abstraction. As an example, many modules can be imported or incorporated into a circuit design in the form of an "Intellectual Property (IP) core" or simply "core."

Generally, a core refers to a pre-designed, programmatic description of hardware that performs a particular function. A core can be specified as an HDL file or files, as a bitstream that programs a programmable integrated circuit device (IC), whether fully or partially programmable, as a netlist, or the like. Alternatively, a core can include source code or schematics that describe the logic and connectivity of a portion of a circuit design. Typical cores can provide digital signal processing (DSP) functions or other mathematical functions. Other examples of cores can implement more complex circuit components or subsystems such as memories, storage elements, or processors. Some cores include an optimally floor-planned layout targeted to a specific family of ICs. Cores can also be parameterizable in that the user may enter parameters to activate or change certain functionality of the core.

When importing a module into a circuit design, a designer must properly connect that module to the circuit design into which the module is being imported. This process typically involves the user manually mapping each port of the module to a complementary port of the circuit design. The time and complexity of this process is dependent upon the number of interfaces in the module and the number of ports within each respective interface.

Modern implementation tools do provide some assistance in this regard, but are unable to effectively process modules that include more than one interface of the same type. Moreover, in order for such a tool to handle interfaces correctly, the interface of the module must strictly adhere to established naming conventions for ports and interfaces alike. That is, if one names ports in a way that deviates, in any respect, from the exact name that is expected by the implementation tool, and which is hard coded in the implementation tool, the implementation tool becomes confused and fails. Accordingly, these tools presently offer little in the way of flexibility.

SUMMARY

The embodiments disclosed within this specification relate to integrated circuit devices and, more particularly, to processing ports when importing a circuit block or module into a circuit design. One embodiment of the present invention can include a computer-implemented method of incorporating a module within a circuit design. The method can include, responsive to identifying the module to be imported into the circuit design, automatically identifying each port of the module and displaying a list of the ports of the module. A user input can be received that selects a plurality of ports of the module for inclusion in an interface through which the module communicates with the circuit design. Responsive to a user input specifying an interface type, the interface type can be associated with the plurality of ports. The interface type further can be associated with a port list comprising standardized ports. Individual ones of the plurality of ports can be automatically matched with standardized ports from the port list. A programmatic interface description specifying the interface for the module can be output. The programmatic interface description can include the interface type and a mapping of the plurality of ports with standardized ports from the port list.

The computer-implemented method can include, responsive to a user input specifying an interface standard, associating the interface standard with the plurality of ports. The port list also can be selected according to the interface standard, wherein the programmatic interface description further specifies the interface standard.

Automatically matching can include matching strings found within names of ports of the plurality of ports with strings found within names of the standardized ports of the port list, matching ports of the plurality of ports to standardized ports of the port list according to bit width, matching ports of the plurality of ports to standardized ports of the port list according to directionality, or matching ports of the plurality of ports to standardized port of the port list according to latency.

The computer-implemented method can include distinguishing between mandatory standardized ports and optional standardized ports on the port list, determining whether each mandatory standardized port of the port list is matched with a port from the plurality of ports, and indicating whether any mandatory standardized port is not matched with a port from the plurality of ports.

A logical association of the interface of the module with a complementary interface of the circuit design can be stored. Further, the interface type can be a user-defined interface type. In that case, the method can include receiving a user input specifying a port list for the user-defined interface type.

Another embodiment of the present invention can include a computer-implemented method of incorporating a module within a circuit design including, responsive to identifying the module to be imported into the circuit design, automatically identifying each port of the module, identifying at least one property of each port of the module, and automatically assigning ports of the module, according to the property of each port, into at least one group. Each group can represent an interface. For each group, ports of the group can be automatically matched with standardized ports according to the property of each port. A programmatic interface description can be output for each group. Each programmatic interface description can include a mapping of the ports of the module with the standardized ports.

Automatically matching can include matching strings found within names of the ports of the module with strings found within names of the standardized ports, matching ports of the module to standardized ports according to bit width, matching ports of the module to standardized ports according to directionality, matching ports of the plurality of ports to standardized port of the port list according to latency, or the like.

In another aspect, each standardized port can be associated with an interface type. Accordingly, the method can include, for each group corresponding to an interface, automatically determining an interface type for the group according to the interface type of each standardized port matched with a port of the group.

In another aspect, each standardized port can be associated with an interface standard. In that case, the method can include, for each group corresponding to an interface, automatically determining an interface standard for the group according to the interface standard of each standardized port matched with a port of the group.

For at least one group of ports corresponding to an interface, the method can include determining a port list including selected ones of the standardized ports that indicates which of the selected standardized ports are mandatory, determining whether each mandatory standardized port is matched with a port of the at least one group, and indicating whether any mandatory standardized port from the port list is not matched with a port of the at least one group.

Yet another embodiment of the present invention can include a computer program product including a computer-usable medium having computer-usable program code that, when executed by a computer, incorporates a module within a circuit design. The computer-usable medium includes: computer-usable program code that responsive to identifying the module to be imported into the circuit design, automatically identifies each port of the module and displaying a list of the ports of the module; and computer-usable program code that receives a user input selecting a plurality of ports of the module defining an interface through which the module communicates with the circuit design. In addition, the computer-usable medium includes: computer-usable program code that, responsive to a user input specifying an interface type, associates the interface type with the interface, where the interface type is associated with a port list comprising standardized ports; computer-usable program code that automatically matches individual ones of the plurality of ports of the interface with standardized ports from the port list; and computer-usable program code that outputs an interface description specifying the interface for the module, where the interface description comprises the interface type and a mapping of the plurality of ports of the interface with standardized ports from the port list.

The computer-readable medium further comprises computer-usable program code that, responsive to a user input specifying an interface standard, associates the interface standard with the plurality of ports, wherein the port list is also selected according to the interface standard, where the programmatic interface description comprises the interface standard. The computer-usable program code that automatically matches includes computer-usable program code that matches strings found within names of ports of the plurality of ports with strings found within names of the standardized ports of the port list. The computer-usable program code that automatically matches includes computer-usable program code that matches ports of the plurality of ports to standardized ports of the port list according to at least one of bit width or directionality.

The computer-usable medium further includes: computer-usable program code that distinguishes between mandatory standardized ports and optional standardized ports on the port list; computer-usable program code that determines whether each mandatory standardized port of the port list is matched with a port from the plurality of ports; and computer-usable program code that indicates whether any mandatory standardized port is not matched with a port from the plurality of ports.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed within this specification relate to creating an interface for a module to be included within a circuit design. In accordance with the embodiments disclosed herein, automated and semi-automated techniques are disclosed that identify ports of a module that is to be imported into a circuit design. The identified ports can be processed and assigned to groups, e.g., collections of ports, that represent interfaces of the module. A description for each of the interfaces can be generated and output. Accordingly, the interfaces of the module can be logically bound to complementary interfaces found within the circuit design while requiring little, if any, user intervention. Still, the user may intervene in the process to override various automated tasks and/or create custom interfaces for the module.

The embodiments disclosed herein can be implemented in the form of an electronic design automation (EDA) tool that executes as a computer program within a suitable computer system. A "computer," e.g., a data processing system or a computer system, suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

Figure 1:
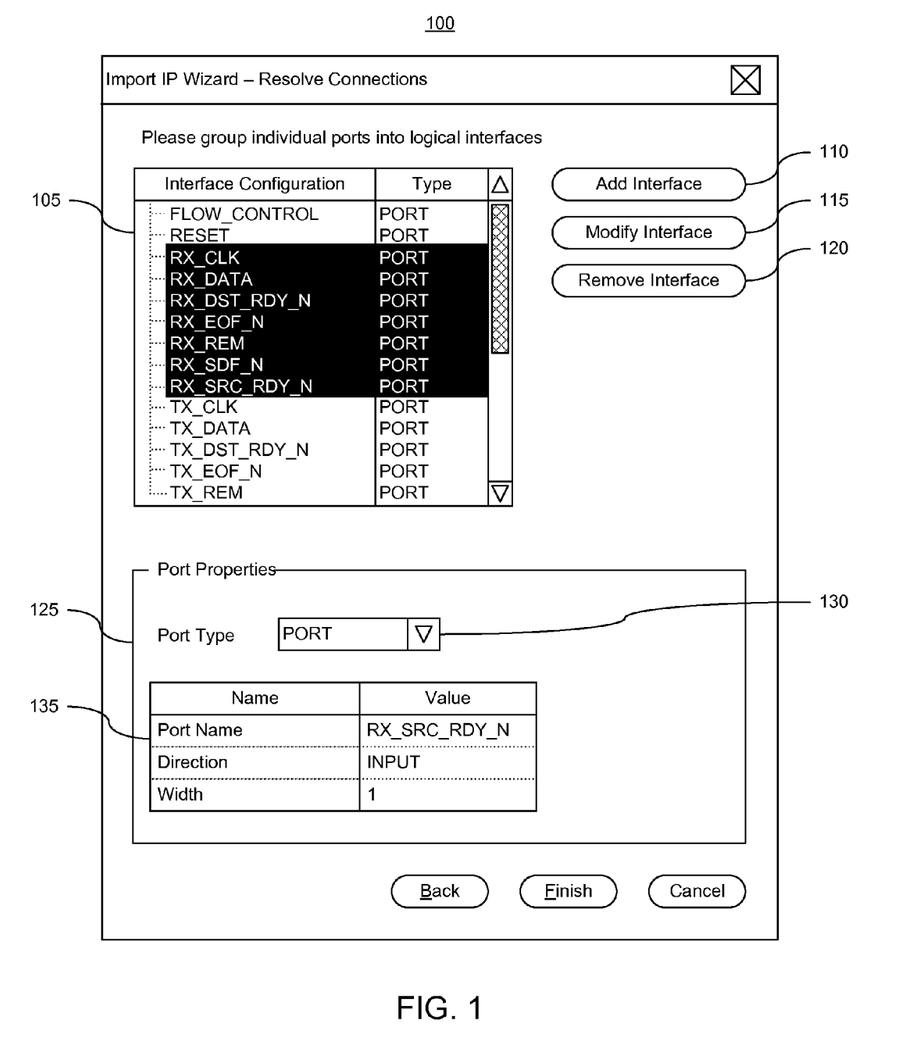
FIG. 1 illustrates a first graphical user interface (GUI) for creating an interface for a module of a circuit design in accordance with one embodiment of the present invention.

FIG. 1 illustrates a first graphical user interface (GUI) 100 for creating an interface for a module of a circuit design in accordance with one embodiment of the present invention. The GUI 100 can be generated by an EDA tool as mentioned. For example, responsive to a user request to import a module into a circuit design, or other larger system, the EDA tool can present one or more GUIs, such as GUI 100, that guide the user through an automated and/or semi-automated process of creating the interface(s) necessary for the imported module to communicate with the other portions of the larger circuit design.

A "module," as used herein, can refer to a programmatic description of a portion of a circuit, e.g., a circuit block. The module may be user-defined or commercially available, e.g., as an Intellectual Property (IP) core. The module may be specified in the form of one or more hardware description language (HDL) files, as a bitstream that programs a programmable integrated circuit device (IC), whether fully or partially programmable, as a netlist, or the like. The module may also be specified in a proprietary format and further may include source code or schematics that describe the logic and connectivity of a portion of a circuit design.

When the module is loaded within, or otherwise identified by, the EDA tool, the ports of that module can be automatically identified by the EDA tool. In some cases, ports are explicitly enumerated within a list of ports that is maintained within, or reference by, the module. Window 105 of GUI 100 illustrates a plurality of objects that have been detected within the module being imported ("the module"). The name of each object, as extracted from the module, is listed beneath the "Interface Configuration" column of window 105. The type of each object listed beneath the "Interface Configuration" column is specified in the "Type" column. In this example, each object listed in window 105 is a port. Each port of the module can be displayed or made viewable through window 105.

Generally, a "port" refers to a collection of one or more signals, e.g., wires, that have a single, common purpose. For example, a port may refer to one or more data signals, clock signals, or the like, of the module. As such, each port will have a width of 1 or more bits. An "interface" refers to a collection of one or more ports or signals. An interface, for example, can implement a bus. The interface will include or specify each port necessary for implementing a given type of interface, e.g., clock ports, data ports, reset ports, and the like. Typically, the interface will conform to a known standard, though this need not be the case. When the interface does conform with a known standard, that interface will include a known set of ports having known, or predetermined, port properties.

Within GUI 100, a user may select a plurality of ports that are to be assigned to a group for inclusion within a particular interface to be created. As shown, the user has selected a plurality of ports detected from the module. The selected ports are highlighted within window 105. With any ports of the module that are to be combined into an interface being selected, the user may select the "Add Interface" button 110.

The "Modify Interface" button 115 allows a user to modify the properties of any interface defined for the module that is displayed and selected within window 105. Though no interface is listed within window 105, were an interface to be displayed, as will be illustrated with reference to the remaining figures, the user would be able to select that interface within window 105 and then select the "Modify Interface" button 115 to change properties of the selected interface.

The "Remove Interface" button 120 allows a user to delete or remove a particular interface from the module. Again, should an interface be displayed within window 105, the user may select that interface. Responsive to selecting the "Remove Interface" button 120, the interface would be removed from the module. It should be appreciated that removal of the interface will not delete ports of the interface. Rather, the ports of the deleted interface will continue to be listed within window 105, though those ports will not be associated with, or be considered part of, any interface of the module. Further illustration of the removal of an interface will be described with reference to the remaining figures.

Within section 125 of GUI 100, a user can specify properties of individual ports listed in window 105. The controls illustrated in section 125 will display, and allow one to edit, properties of any individual port that may be highlighted in window 105. Thus, for example, a user can specify the type of the port highlighted in window 105 via drop down selection box 130. While "PORT" is shown as being selected in drop down selection box 130, other examples of port types can include, "CLOCK," "RESET," "INTERFACE," or the like. Further properties of a port selected in window 105 can be specified in window 135 such as the port name, the direction of the port, and the width of the port in terms of bits.

Once the user has selected the ports to be combined into an interface and specified any port properties as may be desired, the user can select the "Next" button to proceed to the next phase of interface creation for the module.

Figure 2:
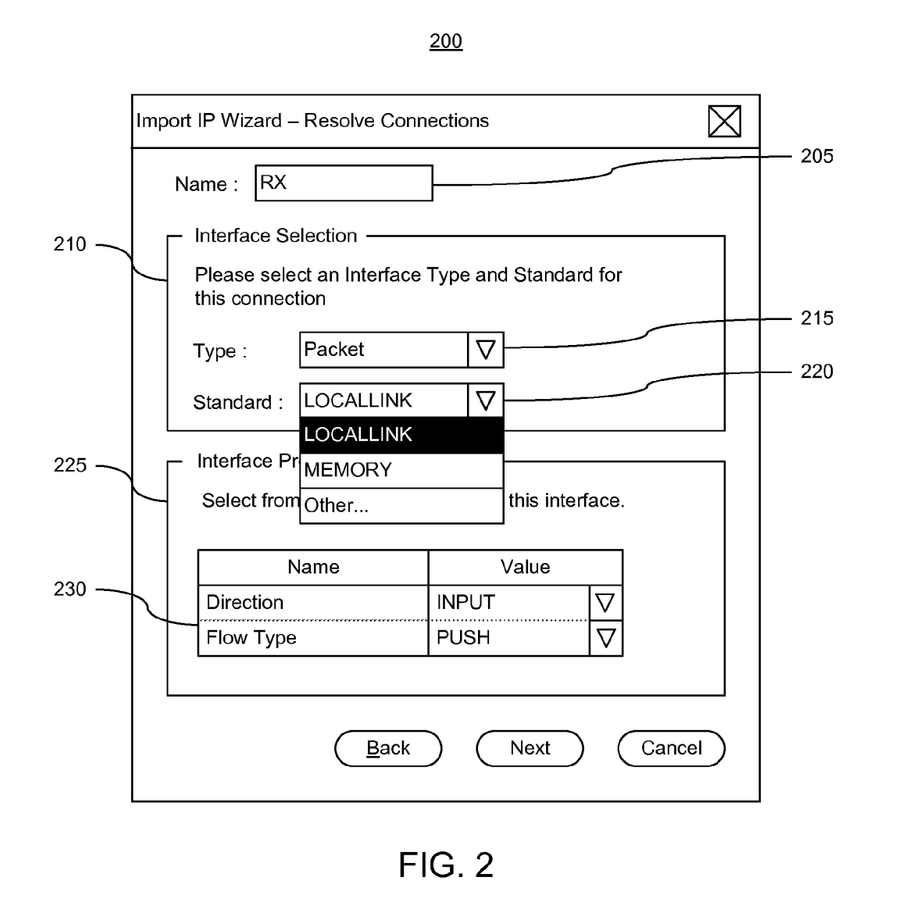
FIG. 2 illustrates a second GUI for creating an interface for a module of a circuit design in accordance with another embodiment of the present invention.

FIG. 2 illustrates a second GUI 200 for creating an interface for a module of a circuit design in accordance with another embodiment of the present invention. GUI 200 can be presented, for example, responsive to the user selecting the "Add Interface" button within GUI 100 of FIG. 1. GUI 200 includes a name field 205, a section 210, and a section 225.

The EDA tool can analyze the various ports selected within window 105 of FIG. 1 and identify one or more properties of each selected port. In one embodiment, any property that is shared among, or common to, each of the selected ports can be used to auto-fill field 205. Field 205 is used to specify a name for the interface being created. In this manner, the EDA tool can automatically suggest a name for the interface. It should be appreciated, however, that the user may specify a desired name for the interface at any time, whether or not the EDA tool was able to automatically suggest an interface name.

In one example, string matching can be performed to identify a string of letters, characters, symbols, and/or numbers (hereafter collectively "symbols") from the names of each of the selected ports. In this case, each selected port begins with the symbols "RX." The EDA tool can analyze strings within the name of each selected port up to a particular symbol, can analyze the first "N" symbols, where "N" represents an integer greater than zero, or can analyze strings within the entirety of each name of each selected port. In this example, the EDA tool can determine the starting symbols of each port name up to the underscore ("_") character. Since each port name of a selected port includes "RX" at its beginning, that string can be identified and used, or auto-filled, into field 205 as the interface name.

Section 210, referred to as the "Interface Selection" section, allows the user to specify properties of the interface being created. More particularly, the user can specify a type of the interface through drop down selection box 215 and specify a standard to which the interface will adhere in drop down selection box 220. In this example, drop down selection box 215 indicates "Packet" as the type of the interface "RX," indicating that the interface will exchange packetized data. The menu item "LOCALLINK" has been selected in drop down selection box 220. "LocalLink" refers to an interface standard that defines a set of protocol-agnostic signals. The "LocalLink" interface standard allows transmission of packet-oriented data and enables a set of features such as flow control and transfer of data of arbitrary length. The "LocalLink" standard is promulgated by Xilinx®, Inc. of San Jose, Calif.

As shown, drop down selection box 220 illustrates the additional standard of "MEMORY" indicating that the interface will be connected to a memory. The "Other" menu item allows a user to create a customized standard to which the interface will adhere. This allows users to create one or more customized standards that may be used within the system being developed as well as reused within subsequent circuit designs. For example, responsive to selecting "Other," the user can provide a port list specifying standardized ports for the user-specified and custom interface. The port list, as described with reference to known standards, can enumerate the different types of ports found within the custom interface as well as indicate which are mandatory. This option allows a user to define a customized type of interface that can be saved, recalled, and re-used in further user-specified designs.

The available interface types listed within this specification which may be available as selectable options in drop down selection box 215 are provided for purposes of illustration only and are not intended to limit the embodiments disclosed herein. Other interface types can be included as potential user selections. For example, Media Independent Interface (MII), as set forth in IEEE Standard 802.3u, or Gigabit Media Independent Interface (GMII), as set forth in IEEE Standard 802.3, can be included as selectable options.

Section 225, referred to as the "Interface Properties" section, allows a user to specify one or more properties of the interface being created, e.g., the RX interface in this case. Within window 230, the user can specify the direction of the RX interface as well as the flow type. In this example, as shown, the "Direction" will be "INPUT" and the "Flow Type" will be "PUSH." The directionality of the RX interface will define the relationship of the RX interface with respect to the system within which the module is being imported and the complementary interface to which the RX interface will be bound or logically associated.

Figure 3:
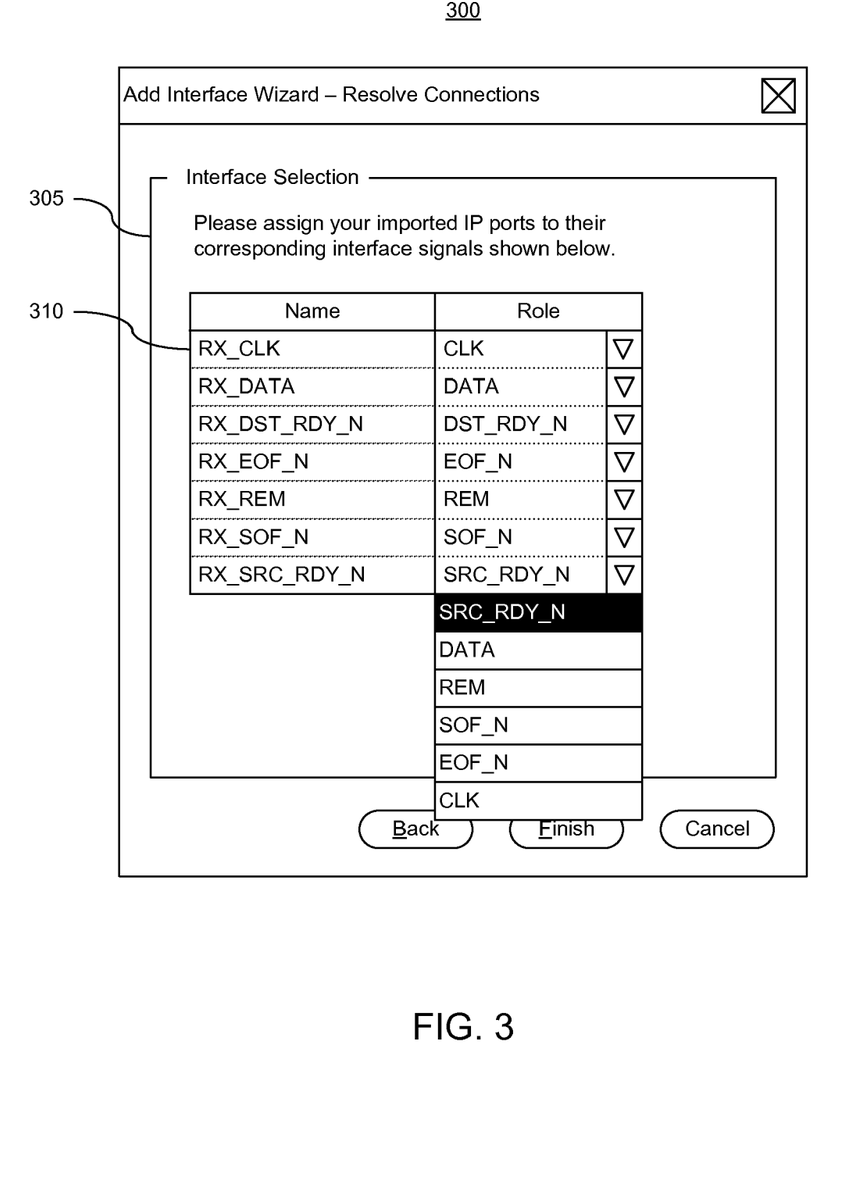
FIG. 3 illustrates a third GUI for assigning ports to standardized ports of an interface for a module of a circuit design in accordance with another embodiment of the present invention.

FIG. 3 illustrates a third GUI 300 for assigning ports to standardized ports of an interface for a module of a circuit design in accordance with another embodiment of the present invention. Window 310 of section 305 allows a user to map ports of the module to standardized port names. The standardized port names will be common with port names of the interface in the circuit design to which the interface being created will connect. For example, the complementary interface in the circuit design to which the RX interface will connect also will have ports mapped to these same standardized ports.

The column "Name" within window 310 lists the name of each selected port extracted from the module being imported, e.g., the name of each port selected in FIG. 1. The "Role" column lists names of standardized ports that are expected to be present within an interface of the type and standard specified in FIG. 2. As noted, the standard of a given interface will mandate particular signals. Window 310 allows a user to map, or re-map as the case may be, port names to interface roles, e.g., functions.

In one embodiment, the EDA tool can automatically match port names of the module with standardized port names. The automatically matched standardized port names can be populated in the "Value" column of window 310. For example, each type of interface and/or interface standard can be associated with a port list. That port list will specify each standardized port that is expected within an interface of the enumerated type and/or standard. Further, the port list can indicate which of the standardized ports, if any, are optional. That is, in some cases, not every standardized port is needed for an interface of a given type or standard. Standardized ports not needed for compliance with a selected type and/or standard are considered optional, while the others are considered mandatory.

In the example pictured in FIG. 3, a string matching technique can be used to match port names with standardized ports. As noted, the first set of symbols up to the underscore symbol can be used to specify the interface name. The characters that follow the interface string "RX," can be used for purposes of matching each port name with a standardized port from the relevant port list.

For example, the type of interface being created in this example is "Packet" with a standard of "LocalLink." The interface type of "Packet" and the standard of "LocalLink," taken individually or in combination, can specify a port list. The port list will specify each standardized port found within such an interface and/or standard. String matching can be performed with respect to the port names of the module and the standardized ports on the port list. That is, strings of the port names can be compared with strings found within the standardized ports to match ports of the module to standardized ports. Thus, the port name "RX_CLK" can be matched with the standardized port "CLK" by virtue of the matching string "CLK." Similarly, the port named "RX_DATA" can be automatically mapped to the standardized port named "DATA" by virtue of the matching string "DATA."

Other techniques for matching ports to standardized ports can include comparing the bit width of ports with the bit width of standardized ports, comparing directionality of ports with the directionality of standardized ports, or comparing any other properties noted within this specification. For example, latency of ports can be compared with latency of standardized ports for matching purposes. It should be appreciated that any combination of properties can be compared, including all available properties, to determine whether a particular port of the module matches a particular standardized port from the port list.

In cases where a reliable match is not determined by the EDA tool, the user may manually specify a standardized port from the port list to be associated with a given port of the module. For example, by selecting the drop down box control for any of the ports in the "Value" column of window 310, the user is presented with each standardized port from the port list. The user then may make a selection. That selection, specifying a standardized port, will be matched with the corresponding port in the "Name" column of window 310.

Figure 4:
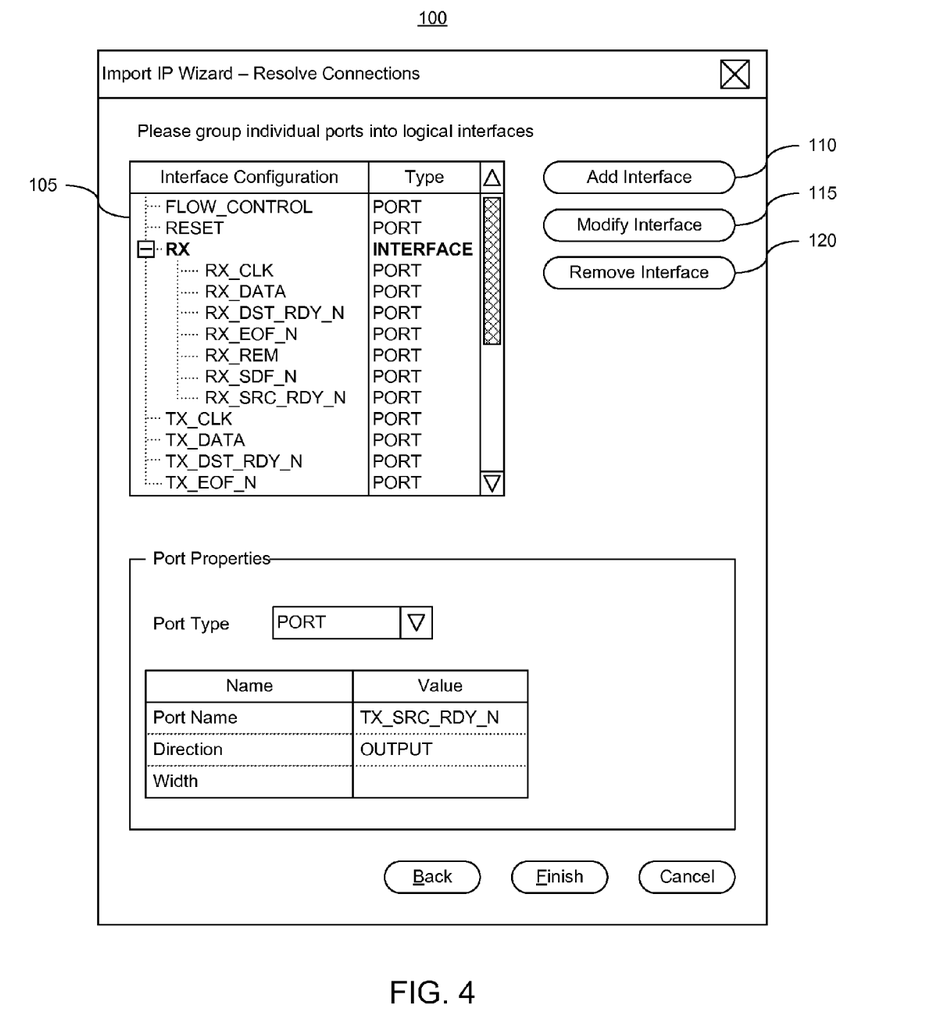
FIG. 4 illustrates the first GUI of FIG. 1 subsequent to creation of the interface for the module in accordance with another embodiment of the present invention.

FIG. 4 illustrates the first GUI of FIG. 1 subsequent to creation of the interface for the module in accordance with another embodiment of the present invention. As shown within window 105, a new interface named "RX" has been created. The ports initially selected by the user and characterized as described with reference to FIGS. 1-3 are shown in hierarchical fashion beneath the interface node. Further, the entry in the "Type" column for the RX interface indicates that the object is an interface as opposed to a port. When presented again with GUI 100, the user may continue to define further interfaces or stop the process.

With the RX interface being created and listed within window 105, the user may select the RX interface and actuate the "Modify Interface" button 115 to edit the now created RX interface. The user may also select the RX interface and actuate the "Remove Interface" button 120 to delete the newly created RX interface. As noted, when the RX interface is removed, the ports that form that interface, e.g., the RX interface, can remain within the module and can remain displayed within window 105. The ports, however, will still be displayed as shown in FIG. 1. The ports of the deleted interface will no longer be associated with any interface and will not be hierarchically ordered beneath any node. The ports may or may not be selected as illustrated in FIG. 1. It may be desirable to illustrate which ports are no longer associated with an interface by virtue of the remove interface action. In that case, the ports can remain selected or be distinguished from other ports using another visualization technique.

The GUIs illustrated with respect to FIGS. 1-4 have been used for purposes of illustration only. Those skilled in the art will recognize that different GUI configurations using different controls may be used to implement the various functions described. As such, the embodiments described within this specification are not intended to be limited by the particular type of GUI or the particular type of controls used.

Figure 5:
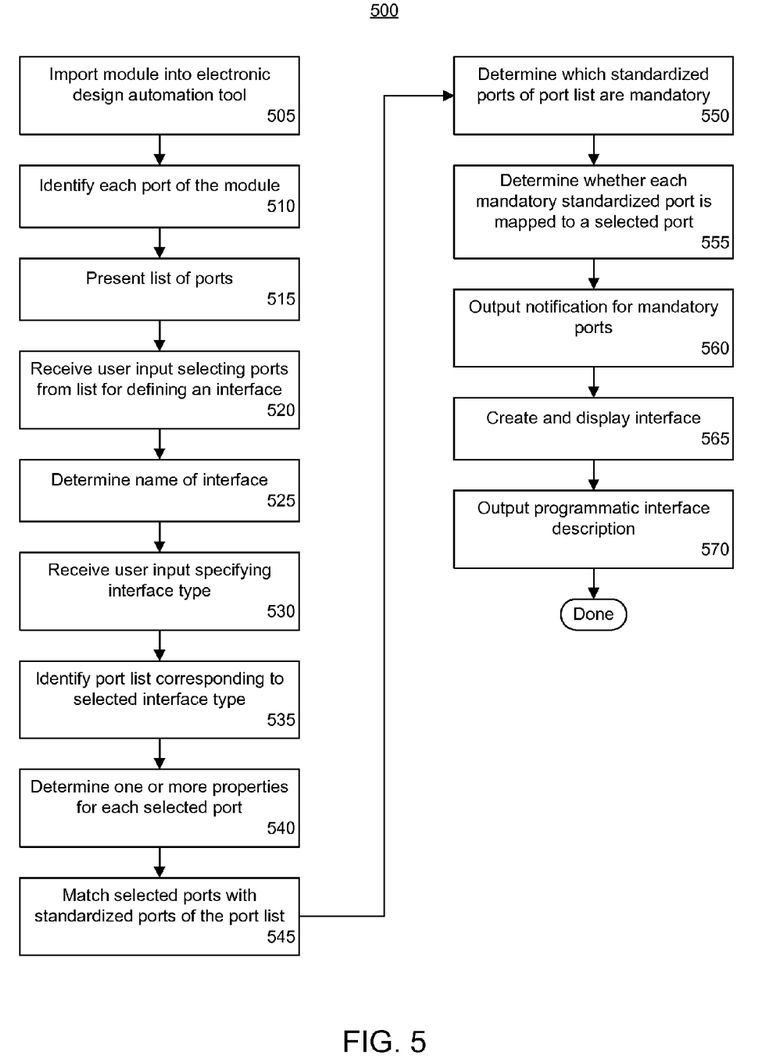
FIG. 5 is a first flow chart illustrating a method of creating an interface for a module of a circuit design in accordance with another embodiment of the present invention.

FIG. 5 is a first flow chart illustrating a method 500 of creating an interface for a module of a circuit design in accordance with another embodiment of the present invention. Method 500 illustrates a semi-automated process though which a user may create an interface for a module that is to be incorporated within a larger system.

In step 505, a module can be imported into the EDA tool. In step 510, the EDA tool can automatically identify each port in the module. In step 515, the EDA tool can present a list of the identified ports in the module. In step 520, the EDA tool can receive user input selecting a plurality of ports from the list of the identified ports of the module. The selected ports will be included within a newly created interface for the module.

In step 525, the EDA tool can automatically determine, or infer, a name for the interface to be created. In those cases where the ports conform with a naming convention, such as <interlace>_<port>, the string denoted as "interface" can be used as the interface name. For example, a plurality of selected ports named TX_CLK, TX_RST, and TX_DATA, would result in the interface name "TX." The portion of each port name up to a selected symbol, presuming the name of each selected port is the same up to the enumerated symbol, can be used as the interface name. In the event that automatic interface naming is unsuccessful, the user may specify an interface name by manually entering the desired interface name into the appropriate field of the EDA tool interface.

In step 530, the EDA tool can receive a user input specifying a type of the interface being created. As noted, a standard to which the interface being created must adhere may also be received. In step 535, a port list matching the specified interface type and/or standard can be identified. The port list specifies each standardized port that may be included within the interface being created given the enumerated type and/or standard. As noted, the port list further may specify which standardized ports are mandatory and which are not.

In step 540, one or more properties of each selected port can be determined. The properties can be determined automatically or can be received from the user in the form of one or more user inputs. For example, possible port properties can include the bit width of the port, the directionality of the port, whether the port is a clock or data, as well as strings found within the name of the port.

In step 545, the selected ports can be matched with standardized ports of the port list. This process may be performed automatically by the EDA tool. In one embodiment, string matching can be used to assign each selected port to one of the standardized ports. For example, the name of the port after the first encountered underscore within the name can include one or more strings that may be matched with strings found within the names of the standardized ports. When matched, the assignments of ports of the module to standardized ports can be displayed.

Though string matching is noted as one example of how ports can be assigned to standardized ports, other techniques can be used that rely upon other port properties. For example, directionality of ports can be used to match ports with standardized ports. That is, the directionality of any port must be the same as the directionality of the standardized port to which that port is mapped or assigned. In another example, bit width can be used. Thus, the bit width of any port must be the same as the bit width of the standardized port to which that port is matched or otherwise associated. These matching techniques can be used individually or in any combination.

In step 550, the EDA tool can identify which of the standardized ports of the port list are mandatory standardized ports. In step 555, the EDA tool can determine whether each mandatory standardized port from the port list has been assigned, or mapped, to a corresponding selected port. In step 560, the EDA tool can provide a notification indicating whether each of the mandatory standardized ports of the port list has been assigned to a selected port of the module. The notification further can indicate which mandatory standardized ports have not been assigned.

In step 565, the EDA tool can create and display the interface. The EDA tool can present a view of the interface and the ports included within that interface. The interface can be created as a programmatic interface description. The programmatic interface description can specify the interface name, the ports of the interface, a mapping of those ports to standardized ports, as well as any specified properties of the ports and/or interface itself. For example, information such as the interface type and standard may also be specified by the programmatic interface description.

In step 570, the programmatic interface description can be output. As used within this specification, "outputting" and/or "output" can mean, for example, writing to a file, writing to a user display or other output device, sending or transmitting to another system, exporting, storing in memory, or the like. Once the programmatic interface description is output, the user may repeat the process to create further interfaces. Additional interfaces of the same type can be created, whereas prior solutions limit each module to including one interface of each type.

As noted, a designer can link an interface of the module with a complementary interface of the circuit design. That is, complementary interfaces, e.g., a transmitter interface of the module and a receiver interface of the circuit design, can be associated with one another, thereby automatically linking the ports of each respective interface without the user having to make explicit reference to each individual port. This is possible as the ports of each complementary interface are mapped to the same set of standardized ports, allowing user defined signals within the module to be automatically paired or linked with signals in the circuit design.

Figure 6:
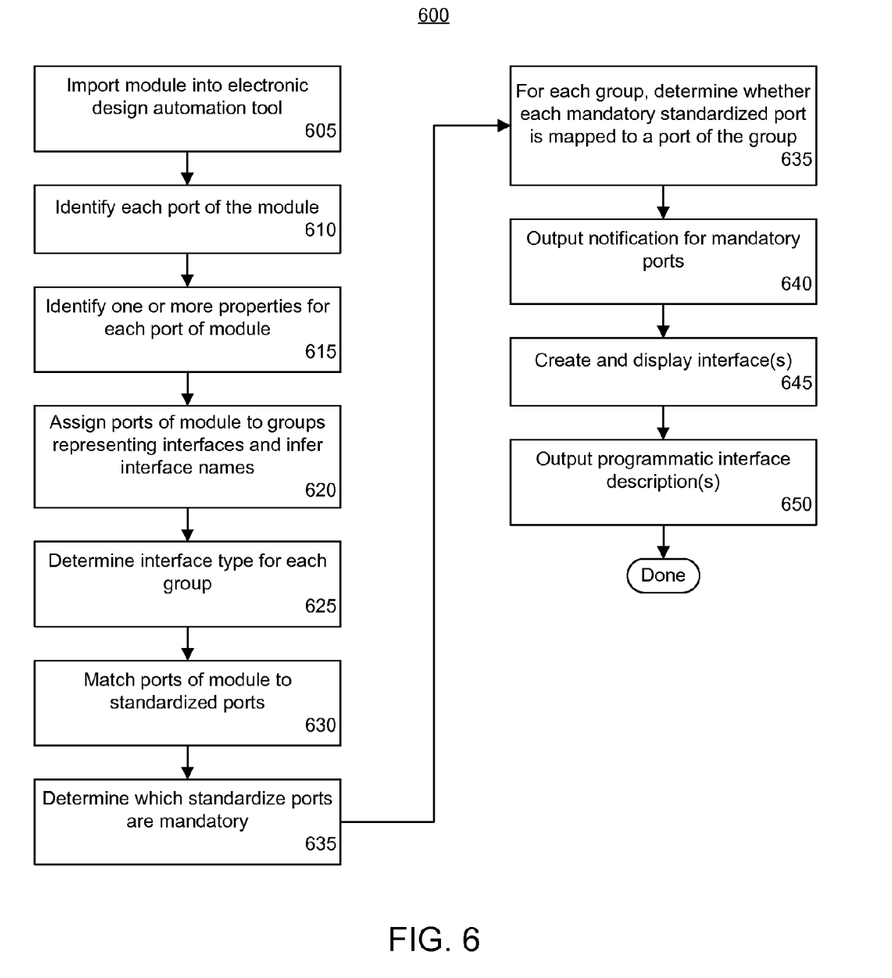
FIG. 6 is a second flow chart illustrating a method of creating an interface for a module of a circuit design in accordance with another embodiment of the present invention.

FIG. 6 is a second flow chart illustrating a method of creating an interface for a module of a circuit design in accordance with another embodiment of the present invention. Method 600 illustrates an automated process though which a user may create an interface for a module that is to be incorporated within a larger system.

In step 605, a module can be imported into the EDA tool. In step 610, the EDA tool can automatically identify each port in the imported module. In step 615, one or more properties for each port can be automatically identified. The properties can include the type of each port, the width of each port, the name of each port, including a parsing of the strings forming each name, and the directionality of each port. This manner of automated naming for the interface provides flexibility in that users are not restricted to using names for ports and/or interfaces that are predetermined and hard coded into the EDA tool. Hard coding of port names and/or interface names prevents automated generation of more than one interface of a given type and/or standard. Users are unable to use naming conventions such as "interface1" and "interface2" or any other custom naming solution else the EDA tool will be unable to automatically identify the ports of the module and unable to determine which of the two interfaces each port belongs.

In step 620, the EDA tool can automatically assign ports of the module to one or more groups, where each group represents, or corresponds to, one interface. Also within step 620, names for the interfaces can be inferred, for example, using string matching as described. In step 625, the EDA tool can automatically determine an interface type for each group of ports. In step 630, the ports of the module can be matched with standardized ports. As noted, each interface type can be associated with a port list specifying the standardized ports found within an interface of that type. As such, ports of each group can be matched with the standardized ports of the port list for each respective group. Similarly, each standard can be associated with a port list specifying the standardized ports found within an interface conforming to that standard. As such, ports of each group can be matched with the standardized ports of the port list for each respective group. In one embodiment, an interface type and/or standard for each group can be determined according to the interface type and/or standard of the majority of, or largest number of, standardized ports matched with ports of each respective group.

Steps 615, 620, 625, and 630, though shown in a particular order, may be reordered or performed concurrently, within a process that automatically assigns ports of the module to different groups corresponding to interfaces. For example, ports of the interface can be matched with standardized ports across a plurality of, or all, interface types and/or standards. The ports can be matched with standardized ports using the various techniques described within this specification. For example, each standardized port may be associated with a given interface type and/or standard. Accordingly, once a port is matched with a standardized port, the type of the interface can be inferred from the matching standardized port. As noted, string matching and other property matching techniques can be used to group ports into interfaces. Further, at any point within the automated flow described with reference to FIG. 6, the user may intervene and override the results determined using the EDA tool.

In step 635, the EDA tool can automatically identify which of the standardized ports, for each group representing an interface, are mandatory standardized ports. In step 640, the EDA tool can determine, for each group, whether each mandatory standardized port for that group has been assigned, or mapped, to a corresponding port of the group.

In step 640, the EDA tool can provide a notification indicating whether each of the mandatory standardized ports for each group have been assigned to ports of the group. The notification further can indicate which mandatory standardized ports of each group have not been assigned. In step 645, the EDA tool can create and display the interface. In step 650, the interface description can be output.

The embodiments described within this specification also can be applied to situations in which the interface being developed or created is hierarchical in nature. This allows the user to define one or more additional levels beneath the top level of the interface being created or configured. For example, within FIG. 4, the "RX" interface may have multiple levels beneath, where the second highest level, e.g., the level immediately beneath "RX," can include one or more nodes, each corresponding to another interface, or sub-interface, of "RX." While still further levels may be introduced, for purposes of illustration, the third level may include the actual port mappings of the second level nodes. This effectively allows a user to create an interface that can be formed of other interfaces and provides additional flexibility as each "sub-interface" may be any of the defined interface types or types that may be customized by the end user.

The embodiments disclosed within this specification provide an enhanced and simplified methodology for creating interfaces for modules. Users may take advantage of automated interface creation techniques or semi-automated interface creation techniques. Users may pre-select particular ports to be included within a given interface being created. The user may define a name for each interface and add several interfaces of the same type to the module. An interface can be presented through which the user may choose interface ports and matching standardized ports. The high degree of user familiarity with ports on the module, e.g., the user's module being imported, adds to the intuitiveness of the process.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of incorporating a module within a circuit design, the method comprising:
   responsive to identifying the module to be imported into the circuit design, automatically identifying each port of the module and displaying a list of the ports of the module;
   receiving a user input selecting a plurality of ports of the module for inclusion in an interface through which the module communicates with the circuit design;
   responsive to a user input specifying an interface type, associating the interface type with the plurality of ports, wherein the interface type is associated with a port list comprising standardized ports;
   automatically matching individual ones of the plurality of ports with standardized ports from the port list using a processor;
   distinguishing between mandatory standardized ports and optional standardized ports on the port list;
   determining whether each mandatory standardized port of the port list is matched with a port from the plurality of ports; and
   indicating whether any mandatory standardized port is not matched with a port from the plurality of ports.

2. The method of claim 1, further comprising, responsive to a user input specifying an interface standard, associating the interface standard with the plurality of ports, wherein the port list is also selected according to the interface standard, wherein the programmatic interface description comprises the interface standard.

3. The method of claim 1, wherein automatically matching comprises matching strings found within names of ports of the plurality of ports with strings found within names of the standardized ports of the port list.

4. The method of claim 1, wherein automatically matching comprises matching ports of the plurality of ports to standardized ports of the port list according to bit width.

5. The method of claim 1, wherein automatically matching comprises matching ports of the plurality of ports to standardized ports of the port list according to directionality.

6. The method of claim 1, wherein automatically matching comprises matching ports of the plurality of ports to standardized ports of the port list according to latency.

7. The method of claim 1, further comprising:
   outputting a programmatic interface description specifying the interface for the module, wherein the programmatic interface description comprises the interface type and a mapping of the plurality of ports with standardized ports from the port list.

8. The method of claim 1, further comprising storing a logical association of the interface of the module with a complementary interface of the circuit design.

9. The method of claim 1, wherein the plurality of ports selected by the user input are a subset of the ports on the list of ports of the module displayed.

10. A method of incorporating a module within a circuit design, the method comprising:
    responsive to identifying the module to be imported into the circuit design, automatically identifying each port of a plurality of ports of the module;
    identifying at least one property of each port of the module;
    automatically assigning ports of the module, according to the at least one property of each port, into at least one group, wherein each group represents an interface, wherein each group is a subset of the plurality of ports of the module;
    for each group, automatically matching ports with standardized ports according to the at least one property of each port using a processor;
    distinguishing between mandatory standardized ports and optional standardized ports on a port list of standardized ports; and
    determining whether each mandatory standardized port of the port list is matched with a port from the plurality of ports.

11. The method of claim 10, wherein automatically matching comprises matching strings found within names of the ports of the module with strings found within names of the standardized ports.

12. The method of claim 10, wherein automatically matching comprises matching ports of the module to standardized ports according to bit width.

13. The method of claim 10, wherein automatically matching comprises matching ports of the module to standardized ports according to directionality.

14. The method of claim 13, wherein each standardized port is associated with at least one of an interface type or an interface standard, the method comprising, for each group corresponding to an interface, automatically determining an interface type or an interface standard for the group according to the interface type or the interface standard of each standardized port matched with a port of the group.

15. The method of claim 10, further comprising:
indicating whether any mandatory standardized port from the port list is not matched with a port of the at least one group.

16. A computer program product comprising:
a non-transitory computer-usable medium comprising computer-usable program code that, when executed by a computer, incorporates a module within a circuit design, the computer-usable medium comprising:
computer-usable program code that responsive to identifying the module to be imported into the circuit design, automatically identifies each port of the module and displays a list of the ports of the module;
computer-usable program code that receives a user input selecting a plurality of ports of the module defining an interface through which the module communicates with the circuit design;
computer-usable program code that, responsive to a user input specifying an interface type, associates the interface type with the interface, wherein the interface type is associated with a port list comprising standardized ports;
computer-usable program code that automatically matches individual ones of the plurality of ports of the interface with standardized ports from the port list;
computer-usable program code that distinguishes between mandatory standardized ports and optional standardized ports on the port list;
computer-usable program code that determines whether each mandatory standardized port of the port list is matched with a port from the plurality of ports; and
computer-usable program code that indicates whether any mandatory standardized port is not matched with a port from the plurality of ports.

17. The computer-program product of claim 16, wherein the computer-readable medium further comprises computer-usable program code that, responsive to a user input specifying an interface standard, associates the interface standard with the plurality of ports, wherein the port list is also selected according to the interface standard, wherein the programmatic interface description comprises the interface standard.

18. The computer program product of claim 16, wherein the computer-usable program code that automatically matches comprises computer-usable program code that matches strings found within names of ports of the plurality of ports with strings found within names of the standardized ports of the port list.

19. The computer program product of claim 16, wherein the computer-usable program code that automatically matches comprises computer-usable program code that matches ports of the plurality of ports to standardized ports of the port list according to at least one of bit width or directionality.

20. The computer program product of claim 16, wherein the computer-usable medium further comprises:
computer-usable program code that outputs an interface description specifying the interface for the module, wherein the interface description comprises the interface type and a mapping of the plurality of ports of the interface with standardized ports from the port list.

* * * * *